United States Patent
Tayrac et al.

(10) Patent No.: US 9,736,844 B2
(45) Date of Patent: Aug. 15, 2017

(54) METHOD OF DYNAMIC RESOURCE CONTROL AND ASSOCIATED SYSTEM

(71) Applicant: THALES, Courbevoie (FR)

(72) Inventors: Pierre Tayrac, Saint Géniès Bellevue (FR); Olivier Courseille, Auzeville Tolosane (FR); Cyrille Yves Joël Blosse, Toulouse (FR); Bruno Roger, Toulouse (FR)

(73) Assignee: THALES, Courbevoie (FR)

( * ) Notice: Subject to any disclaimer, the term of this patent is extended or adjusted under 35 U.S.C. 154(b) by 53 days.

(21) Appl. No.: 14/860,432

(22) Filed: Sep. 21, 2015

(65) Prior Publication Data

US 2016/0088627 A1  Mar. 24, 2016

(30) Foreign Application Priority Data

Sep. 22, 2014 (FR) ...................... 14 02106

(51) Int. Cl.
*H04W 72/04* (2009.01)
*H04B 7/185* (2006.01)

(52) U.S. Cl.
CPC ........ *H04W 72/0453* (2013.01); *H04B 7/185* (2013.01); *H04B 7/18502* (2013.01); *H04B 7/18539* (2013.01)

(58) Field of Classification Search
CPC ............... H04W 72/0453; H04B 7/185; H04B 7/18502; H04B 7/18539
See application file for complete search history.

(56) References Cited

U.S. PATENT DOCUMENTS

| | | | | | |
|---|---|---|---|---|---|
| 6,141,534 | A | * | 10/2000 | Snell | H04B 7/18513 455/10 |
| 8,159,992 | B2 | * | 4/2012 | Agarwal | H04B 7/18528 370/316 |
| 2003/0169699 | A1 | * | 9/2003 | Haardt | H04B 7/18589 370/316 |
| 2007/0104101 | A1 | * | 5/2007 | Sadr | H04B 7/18582 370/230 |

FOREIGN PATENT DOCUMENTS

| | | |
|---|---|---|
| EP | 2 290 844 A2 | 3/2011 |
| WO | 99/49590 A1 | 9/1999 |
| WO | 01/28130 A1 | 4/2001 |

* cited by examiner

*Primary Examiner* — Duc C Ho
(74) *Attorney, Agent, or Firm* — Baker & Hostetler LLP

(57) ABSTRACT

A method of dynamic resource allocation for at least one satellite access network associated with at least one telecommunications satellite comprises a frequency-flexible payload, the at least one satellite access network comprises a plurality of resource allocation controllers. The method comprises the acquisition of the bandwidth desired by each resource allocation controller, reconfiguration of the payload of the at least one satellite considering the bandwidth desired by each resource allocation controller and the frequency resources available on board each satellite, and a step of frequency allocation to the various resource allocation controllers, considering the bandwidth desired by each resource allocation controller and the frequency resources available on board each satellite.

7 Claims, 2 Drawing Sheets

METHOD OF DYNAMIC RESOURCE CONTROL AND ASSOCIATED SYSTEM

CROSS-REFERENCE TO RELATED APPLICATIONS

This application claims priority to foreign French patent application No. FR 1402106, filed on Sep. 22, 2014, the disclosure of which is incorporated by reference in its entirety.

FIELD OF THE INVENTION

The present invention relates to the field of satellite telecommunications. The present invention relates more particularly to a method and a system of dynamic control of satellite resources, and its interfaces with the satellite and the ground segment.

BACKGROUND

The function of what are known as "transparent" satellites is essentially to amplify signals transmitted on uplinks by ground transmitting stations and then retransmit them towards ground receiving stations, via downlinks. These satellites receive sets of signals transmitted by ground transmitting stations, which are then distributed over a set of input channels and, according to a predetermined configuration, routed towards output channels to be transmitted towards the ground receiving stations. The expression used in this context is "signal routing on board a satellite".

At the present time, the signal routing configuration in satellites is most commonly static. Thus, when a satellite telecommunications system is deployed, the power and frequency resources of the satellite are divided up by planning functions (mission planning and frequency planning) among the various satellite access networks or modem systems, acting on one transponder at a time. A certain number of channels of predetermined width is defined, and this configuration remains fixed throughout the life of the satellite. Since the life of a telecommunications satellite may be more than fifteen years, this static configuration does not allow the payload to be adapted to changes in the data traffic. Similarly, within this fixed configuration, the allocation among satellite access networks is also static. Changing this allocation requires the provision of a new plan, resulting in service interruptions.

Some satellites have flexible payloads, enabling the use of the satellite to be optimized during its life. This operation is based on "manual" replanning of the payload, and is generally carried out by engineering the established traffic or by amending the user service contracts. A drawback of this reconfiguration is that it is defined for the period of the mission, and remains fixed throughout this time.

One object of the invention is, notably, to rectify one or more of the shortcomings of the prior art by proposing a solution for automated control of the flexible equipment of a telecommunications satellite or satellites, on the basis of temporal and geographical changes in the established user flows, in compliance with the user service contracts.

To this end, the invention proposes a dynamic resource allocation method for at least one satellite access network associated with a group of at least one telecommunications satellite comprising a frequency-flexible payload, said group of at least one satellite access network comprising a plurality of resource allocation controllers, said method being executed by a dynamic resource allocation device, and comprising:

a step of acquiring a signal representing the value of bandwidth desired by each resource allocation controller of each satellite access network, a step of reconfiguring the payload of the group of at least one telecommunications satellite, with allowance for the values of bandwidth desired by each resource allocation controller and the frequency resources available on board each satellite, a step of frequency allocation to the various resource allocation controllers of the group of at least one satellite access network, with allowance for the values of bandwidth desired by each resource allocation controller and the frequency resources available on board each satellite.

According to one embodiment, if the sum of the values of bandwidth desired by each resource allocation controller is less than the available frequency resources of the satellite, a dynamic frequency allocation module allocates the desired value of bandwidth to each resource allocation controller, if the sum of the values of bandwidth desired by each resource allocation controller is greater than the available frequency resources of the satellite, a dynamic frequency allocation module allocates a predetermined value of bandwidth to each resource allocation controller.

According to one embodiment, the method further comprises, for each resource allocation controller:

a step of acquiring a signal representing the data rate of the resource allocation controller in question, a step of calculating a rate of use of the allocated bandwidth and comparing this rate with a predetermined lower bound, if the rate of use is less than said lower bound, a step of reducing the allocated value of bandwidth by allocating to said resource allocation controller a value of bandwidth corresponding to a rate of use substantially equal to said lower bound.

According to one embodiment, the method further comprises, for each resource allocation controller:

a step of acquiring a signal representing the data rate of the resource allocation controller in question, if the data rate of said resource allocation controller is less than a predetermined nominal value while the value of bandwidth allocated to this controller is greater than said nominal value, a step of reducing the allocated value of bandwidth by allocating to said resource allocation controller a value of bandwidth substantially equal to said nominal value.

According to one embodiment, the method further comprises a step of acquiring a signal representing the quality of service associated with the data to be transmitted by each resource allocation controller and according to which the dynamic resource allocation device increases the priority of the value of bandwidth of the resource controllers having the highest priority, using said quality data.

According to one embodiment, at least one satellite is of the multi-channel type and according to which the method further comprises a step of modifying the gain of at least one of the channels of at least one telecommunications satellite.

The invention also proposes a dynamic resource allocation system for executing the method described above, comprising a dynamic resource allocation device, at least one satellite access network, and at least one communications satellite comprising a frequency-flexible payload, said group of at least one satellite access network comprising a plurality of resource allocation controllers, each resource allocation controller being configured to transmit data to at least one modem, each resource allocation controller being connected to the dynamic resource allocation device, and each resource allocation controller being configured to deliver a signal representing the desired value of bandwidth and to transmit this signal to the dynamic resource allocation device, said dynamic resource allocation device comprising at least one calculation module configured to execute the method previously described, and at least one module configured to allocate a value of bandwidth to the various resource allocation controllers of the group of at least one satellite access network and to reconfigure the payload of each satellite of the group of at least one telecommunications satellite.

BRIEF DESCRIPTION OF THE DRAWINGS

Other distinctive features and advantages of the present invention will be more clearly apparent from a perusal of the following description, provided by way of illustrative, non-limiting example, with reference to the attached figures, in which.

DETAILED DESCRIPTION

The principle of the invention is based on a coupling between the ground stations and the associated telecommunications satellite or satellites, so as to permit the automated dynamic control of the flexible equipment of the satellite or satellites on the basis of the temporal and geographical variation of the actually existing user flows and the real availability of satellite performance, while meeting the nominal service commitment of the telecommunications system. According to the variation in traffic, the payload is reconfigured on the basis of said ground traffic in order to ensure the quality of service. By means of this coupling, the instantaneous available resources of bandwidth, and possibly power, of the satellite or satellites of the telecommunications system can be advantageously used on the basis of user requirements.

Advantageously, this enables the global capacity of the telecommunications system to be optimized, since not every user requires maximum link performance simultaneously.

Figure 1:
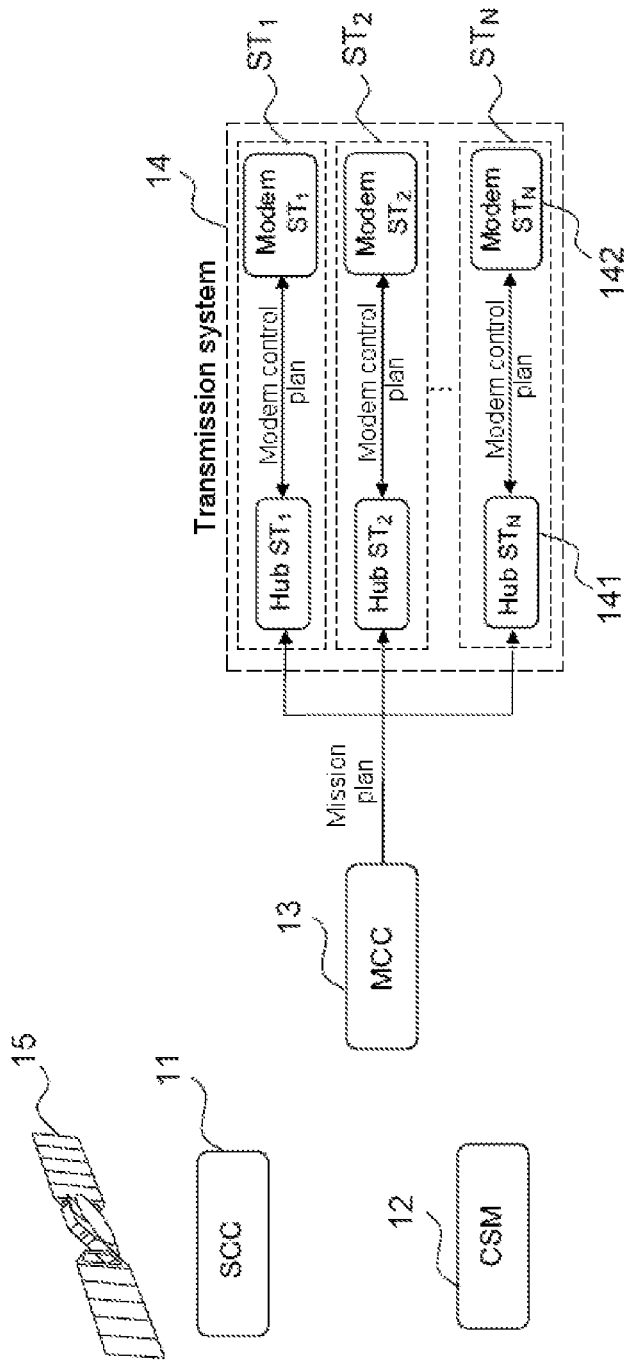
FIG. 1 shows a known prior art telecommunications system.

FIG. 1 shows a known prior art telecommunications system. The system comprises a satellite control centre 11 (abbreviated to SCC in English terminology). The satellite control centre constantly monitors the behaviour of the satellite or satellites for which it is responsible, notably by using remote measurement data. The satellite control centre is the ground-based means for controlling the satellite or satellites and for ensuring that the satellite operates correctly.

The link monitoring centre 12 (or CSM, for Communication Spectrum Monitoring, in the English terminology) monitors the payload (as it is known in the English terminology) of the satellite. Notably, it supplies the radio frequency and digital characteristics of the satellite's transponders. It can also be used to detect undesirable events such as interference or jamming problems.

The satellite access networks 14 comprise a plurality of resource allocation controllers (or hubs) 141, each resource allocation controller 141 controlling at least one modem 142. A satellite access network comprises a resource allocation controller 141 and at least one modem 142. In order not to over-complicate the drawing, only one modem 142 is shown for each resource allocation controller 141 in FIG. 1. The satellite access networks 14 are connected to a mission control centre 13 (abbreviated to MCC in the English terminology). This centre 13 is responsible for the operational control of the satellite's payload. Notably, it defines the mission plan for the satellite control centre 11 and for each satellite access network 14. This mission plan comprises, among other things, the power and frequency allocation tables defining the levels of sharing of these resources among the various resource allocation controllers 141 of the various satellite access networks 14.

As mentioned above, the mission plan is defined at the start of the mission and remains fixed throughout said mission, until a new mission plan is created manually by an operator at the mission control centre 13. Similarly, the connection (in terms of organization or information technology) between the mission control centre 13 and the satellite access network 14 is one-way and is used, among other purposes, for the allocation of resources among the various resource allocation controllers 141 according to the sharing levels defined in the mission plan. Thus each resource allocation controller operates independently.

The satellite control centres 11, the communication spectrum monitoring centres 12, the mission control centres 13 and the various resource allocation controllers 141 of the satellite access networks 14 are generally distributed among the satellite control centre, the network operation centres, and the gateways (as they are known in the English terminology) for regulating the traffic. The various modems 142 are located at the users.

Figure 2:
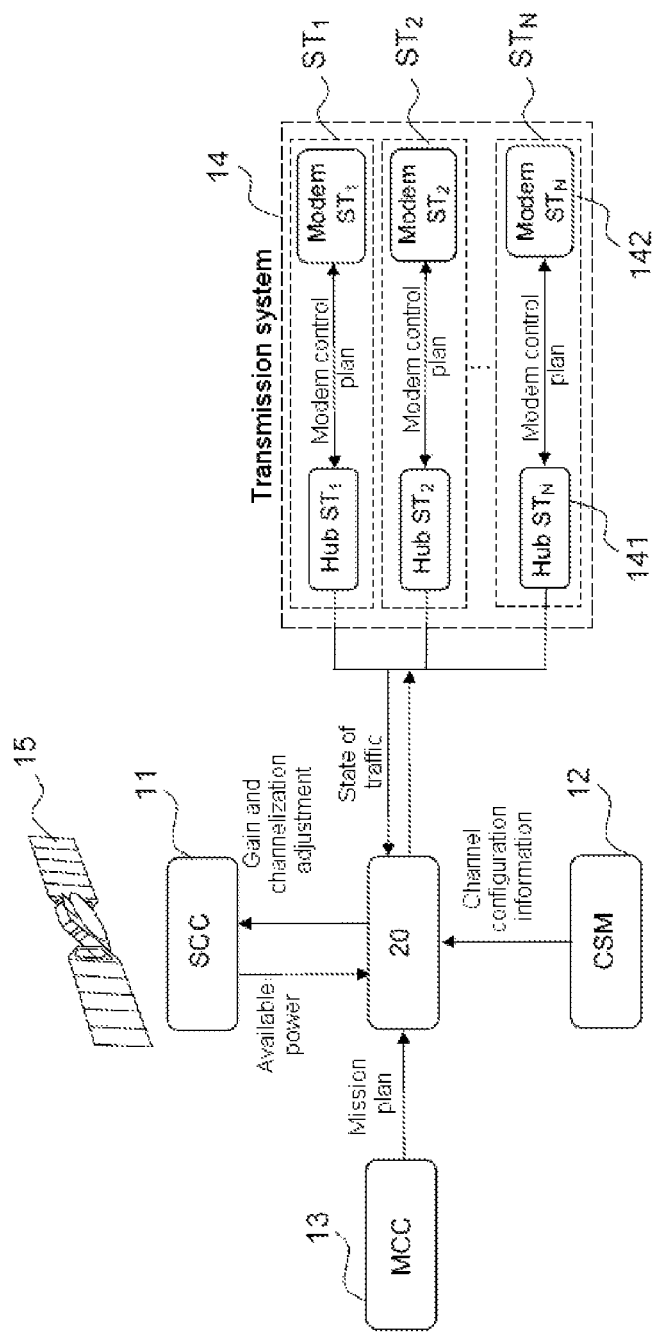
FIG. 2 shows an exemplary embodiment of a system for the dynamic control of the instantaneous available resources of at least one satellite according to the invention.

FIG. 2 shows an exemplary embodiment of a dynamic frequency allocation system for at least one satellite 15 according to the invention.

The system may comprise a satellite control centre 11, a communication spectrum monitoring centre 12, a mission control centre 13 and a satellite access network 14.

In the diagram shown in FIG. 2, the system controls only one satellite 15. This example is not in any way limiting, and the invention may be generalized to include the case in which the system is linked to a plurality of telecommunications satellites 15.

As mentioned above, the mission control centre 13 defines, notably, the mission plan for the satellite control centre 11 and for each satellite access network 14. This mission plan defines a nominal level of sharing of the bandwidth and power resources among the various resource allocation controllers 141 of the various satellite access networks 14.

The present invention relates, notably, to communications satellites 15 having frequency flexibility, that is to say having a payload whose channels have adjustable bandwidth. For example, there may be one or more transparent digital processors. These processors can advantageously be used to provide dynamically reconfigurable channels; thus the signal routing configuration can be defined on the basis of ground station commands.

The proposed mechanism is also suitable for a reallocation of the bandwidth among satellite access networks in a fixed configuration of the satellite.

The group of at least one satellite 15 comprises at least one multi-channel satellite. The satellite or satellites 15 may be of the transparent type, that is to say one which reflects the signals received from one or more ground stations, using transponders.

According to one embodiment, the satellite or satellites 15 may be regenerative satellites, that is to say satellites which decode the received signal in order to carry out processing on this signal and retransmit it to the ground.

The group of at least one satellite may also be composed of a combination of transparent and regenerative satellites.

Advantageously, in the case of regenerative satellites, the solution is optimal because it enables the regenerative capacity of the satellite or satellites 15 to be used in a dynamic way.

The dynamic resource allocation device 20 of at least one satellite 15 is responsible for allocating the resources of bandwidth, and possibly power, to the various resource allocation controllers 141 of the satellite access networks 14 on the basis of the traffic requests sent from groups of modems 142 connected to the various resource allocation controllers 141, and on the basis of the instantaneous resources available at the satellite 15. This device 20 is placed at an intermediate point between the mission control centre 11 and the satellite access networks 14. It can be used to couple the potential flexible equipment on board the telecommunications satellite or satellites and the ground stations so as to optimize the use of the instantaneous available bandwidth and, possibly, power resources. This dynamic resource allocation device 20 is useful in that it provides for dynamic sharing of resources among the satellite access networks, in respect of bandwidth and, possibly, power, on board the communications satellites 15 associated with the system, in order to make the best use of these resources on the basis of the instantaneous data rate requirements of all the connected elements taken together. The power levels available on board the satellite 15 for the purpose of increasing the gain of one or more channels may be specified at the ground station and more particularly at the dynamic resource allocation device 20, using remote measurements.

In the exemplary embodiment shown in FIG. 2, the dynamic allocation device 20 is connected to the satellite control centre 11, to the communication spectrum monitoring centre 12, to the mission control centre 13 and to the satellite access networks 14. The group of satellite access networks 14 comprises N satellite access networks, denoted $ST_1$ to $ST_N$. As before, in order not to over-complicate the drawing, only one modem 142 is shown for each resource allocation controller 141. Evidently, the satellite access networks may have a larger number of modems.

At the start of the mission, the routing on board the telecommunications satellite and the sharing of resources among the satellite access networks are defined according to an initial configuration predetermined in the mission plan. This configuration is then modified in a regular way on the basis of the traffic requirements of the various satellite access networks 14. For the purpose of dynamically controlling the available instantaneous resources on board the satellite, the dynamic resource allocation device 20 acquires a signal representing the value of bandwidth desired by each resource allocation controller 141 of each satellite access network 14. This acquisition of bandwidth requests can be performed at regular intervals or in an irregular manner over time.

According to one embodiment, the time interval between the various acquisitions may be of the order of several seconds or several minutes. This signal may be recorded, at the moment of acquisition for example, in a memory area of the system, so that it can be used subsequently.

In addition to these bandwidth requests, the dynamic resource allocation device 20 may also acquire, at each resource allocation controller 141, other information, for example the quality of service associated with the data to be transmitted by the resource allocation controller (141) in question.

On the basis of the variation in the request for frequency resources from the various resource allocation controllers 141, the dynamic resource allocation device 20 may, by using an algorithm stored in a memory area of the dynamic resource allocation system for example, reconfigure the payload of the communications satellite 15 so as to adjust the signal routing on board the satellite 15 and/or modify the bandwidth allocation of each resource allocation controller 141 of the group of at least one satellite access network 14, with allowance for the values of bandwidth desired by each resource allocation controller 141 and the frequency resources available on board each satellite 15. Thus the dynamic resource allocation device 20 carries out a coordinated reconfiguration of the satellite access networks 14 and, if necessary, of the payload of the associated communications satellite 15, such as, for example, the transparent digital processor or processors, without a break in the established services.

The resource allocation device 20 may calculate the sum of the values of bandwidth desired by each resource allocation controller 141 of each satellite access network 14 and compare this sum with the available frequency resource of the telecommunications satellite 15. For this purpose, the resource allocation device 20 may comprise at least one calculation module.

If the sum of the values of bandwidth desired by each resource allocation controller 141 is less than the available frequency resource, the dynamic resource allocation device 20 can allocate the desired value of bandwidth to each resource allocation controller 141. For this purpose, the dynamic resource allocation device 20 may comprise at least one resource allocation module configured to allocate a value of bandwidth to each resource allocation controller 141 of the various satellite access networks 14.

For each resource allocation controller 141, the value of the bandwidth already allocated may be compared with the value of bandwidth desired by the resource allocation controller 141, in order to check whether the allocated bandwidth is sufficient to permit the traffic. This comparison may, for example, be performed by a calculation module of the resource allocation device 20. If necessary, if the bandwidth is insufficient, the dynamic resource allocation module may increase the value of bandwidth allocated. If the desired value of bandwidth is less than the value already allocated, the resource allocation module may reduce the value of the allocated bandwidth so as to free some of the frequency resource for other resource allocation controllers 141.

In case of high traffic, if the available frequency resources on board the satellite are insufficient to meet the bandwidth requirements of the resource allocation controllers 141, that is to say if the sum of the values of bandwidth desired by each resource allocation controller 141 is less than the available frequency resource on board the satellite, the dynamic resource allocation device can allocate a predetermined value of bandwidth to each resource allocation controller 141. The dynamic resource allocation module may, for example, allocate the value of bandwidth predetermined in the mission plan to each resource allocation controller 141 of the various satellite access networks 14, in order to meet a nominal service commitment to each user of the telecommunications system.

The communication spectrum monitoring centre 12 may calculate and transmit to the dynamic allocation device 20 a signal representing the configuration of the channels on board the telecommunications satellite 15 in terms of bandwidth and gain. Advantageously, this information on the state of the channels may enable the dynamic allocation device 20 to have monitoring feedback on the configuration of the channels on board the satellite and thus to check that the on-board adjustment of the satellite's payload does indeed match the expected adjustment.

According to one embodiment of the method, the calculation module of the dynamic allocation device 20 may calculate the bandwidth used by each resource allocation controller 141 and compare this value to a predetermined lower bound which signifies under-use of the allocated bandwidth.

If the rate of use measured at a resource allocation controller 141 falls below this lower rate, the resource allocation module of the dynamic resource allocation device 20 may reduce the bandwidth allocated to the under-used resource allocation controller 141, for example by reducing the value of bandwidth allocated to the under-used controller 141 to a value substantially equal to the lower bound. This lower bound may, for example, be substantially equal to the nominal value predetermined in the mission plan. The released bandwidth, corresponding to the difference between the value of bandwidth allocated and the predefined nominal value, may thus be reallocated to one or more other resource allocation controllers 141 of one ore more satellite access networks 14.

In order to calculate the rate of use of the bandwidth allocated to a resource allocation controller 141, the dynamic resource allocation device 20 may acquire a signal representing the data rate of the resource allocation controller 141 in question. For this purpose, each resource allocation controller 141 may comprise a measurement device configured to measure the various elementary rates from the various modems 142 in said resource allocation controller and deliver a signal representing a global rate. This measurement device may also be configured to transmit this signal to the dynamic resource allocation device 20. This signal may be recorded simultaneously at the moment of acquisition in a memory area of the dynamic power allocation system, so that it can be used subsequently.

According to one embodiment, if the calculation module of the dynamic resource allocation device 20 detects a resource allocation controller 141 which is inactive or whose traffic is less than a predetermined nominal value signifying a very low activity of the controller 141 while the value of the bandwidth is greater than the nominal value predetermined in the mission plan, it may decide to reduce the value of bandwidth allocated to this controller to a value substantially equal to said nominal value, or even to a value below this. Should the value of the bandwidth allocated be less than the nominal value, then as soon as this resource allocation controller 141 transmits a traffic request the value of its allocated bandwidth will be reset to at least its nominal value even if this traffic does not have priority, since the nominal value corresponds to a guaranteed lower bound.

Advantageously, the capacity to reallocate the resources not used by one or more resource allocation controllers 141 to the other controllers 141 permits the use of all of the instantaneously available resources, and therefore enables the capacity of the telecommunications system to be increased.

In case of conflict, and particularly if there is a lack of available resources on board the satellite, then, in order to meet a frequency resource requirement for one or more satellite access networks 14, a priority mechanism may be provided in the resource allocation algorithm, so as to increase the priority of the bandwidth of the resource controllers 141 having the highest priority, using, for example, the quality of service data supplied by said resource allocation controllers.

In some cases, when the payload of the satellite 15 is reconfigured, the values of bandwidth and gain or power of some channels may be readjusted simultaneously.

On board telecommunications satellites 15, the channels are defined on the basis of the traffic to be transmitted. The dynamic resource allocation device 20 assigns a value of gain and bandwidth on the basis of the characteristics of the signal or signals to be transmitted. If the channel transmits the same type of signals, the dynamic resource allocation device 20 may modify only the channel width on the basis of the data rate to be transmitted. If the channel has to transmit another type of signal, for example one having another, more complex waveform, the device 20 may also modify the gain of the transponder on board the satellite 15.

On board the satellite 15, the channels are also defined for a connected element between one coverage and another. When the payload is reconfigured, if the coverage of the channel is not modified, the dynamic resource allocation device 20 does not necessarily have to modify the gain of the channel. On the other hand, if the coverage of the channel is modified, the dynamic resource allocation device 20 may be required to revise the value of gain assigned to the channel.

By way of example, it will be assumed that the gain of a channel has been defined for a given coverage. If this channel is now assigned to a new resource allocation controller 141 in a reconfiguration of the payload of a satellite 15, for example in order to increase the frequency resource of the channel, this dynamic resource allocation device 20 may have to assign a new gain value to this channel in order to allow for the new coverage. It may, for example, increase the gain value if the ground stations are less powerful or if the area to be covered is larger than that covered previously.

The power data available on board the telecommunications satellite 15 may be supplied to the dynamic resource allocation device 20 by means of remote measurements.

According to one embodiment, the modifications made during the reconfiguration of the telecommunications system may be predetermined in a resource allocation algorithm which is, for example, stored in a memory area of the system and is executed at predetermined instants of time. This illustrative case may be encountered, for example, where there is a regular load profile over 24 hours.

By way of example, we may consider a satellite having a frequency-flexible payload and covering two areas, one in the east and one in the west. In this case, the resource allocation algorithm can use the time difference between east and west to transfer the bandwidth resource, and if necessary the gain resource, from one coverage to the other, according to the rate of use of the available resource.

According to one embodiment, the various calculations are carried out using at least one algorithm stored in a memory area of the dynamic resource allocation system, for example a memory area of the dynamic resource allocation device 20.

According to one embodiment, the dynamic resource allocation device 20 may be, or may comprise, a computer, a processor, a logic processing unit or any other equivalent data processing means.

Similarly, the various modules present in the dynamic resource allocation system, such as the calculation modules and the resource allocation modules, may be or may comprise one or more computers, one or more processors, one or more logic processing units, a combination of the aforesaid elements, or any other equivalent data processing means.

Advantageously, the invention enables the configuration of the ground stations and the payload of the telecommunications satellite or satellites 15 associated with the ground stations to be adjusted in a coordinated, automated way, by transferring the detected margins in terms of bandwidth and power from one connected element of a satellite to another. These transfers can be performed on the basis of a dynamic analysis of the data of the satellite or satellites 15, based on remote measurement for example, and of the existing traffic.

This capacity for automated exploitation of satellite flexibility makes it possible to simplify the operations of the telecommunications system and to increase the capacity of the system significantly to improve the data rate and/or the availability of the user links, since the connected elements do not all require maximum performance simultaneously.

The invention claimed is:

1. A method of dynamic resource allocation for a group of at least one satellite access network associated with a group of at least one telecommunications satellite comprising a frequency-flexible payload, said at least one satellite access network comprising a plurality of resource allocation controllers, said method being implemented by a dynamic resource allocation device, and comprising:
   a step of acquiring a signal representing the value of the bandwidth desired by each resource allocation controller of said at least one satellite access network,
   a step of reconfiguring the payload of the group of at least one telecommunications satellite, considering the values of bandwidth desired by each resource allocation controller and the frequency resources available on board said at least one telecommunications satellite,
   a step of frequency allocation to the various resource allocation controllers of the group of at least one satellite access network, considering the values of bandwidth desired by each resource allocation controller and the frequency resources available on board said at least one telecommunications satellite.

2. The method according to claim 1, wherein:
   if the sum of the values of bandwidth desired by each resource allocation controller is less than the available frequency resources of the satellite, a dynamic frequency allocation module allocates the desired value of bandwidth to each resource allocation controller, and
   if the sum of the values of bandwidth desired by each resource allocation controller is greater than the available frequency resources of the satellite, a dynamic frequency allocation module allocates a predetermined value of bandwidth to each resource allocation controller.

3. The method according to claim 1 further comprising, for each resource allocation controller:
   a step of acquiring a signal representing the data rate of the a resource allocation controller in question,
   a step of calculating a rate of use of the allocated bandwidth and comparing this rate with a predetermined lower bound,
   if the rate of use is less than said predetermined lower bound, a step of reducing the allocated value of bandwidth by allocating to said resource allocation controller in question, a value of bandwidth corresponding to a rate of use substantially equal to said lower bound.

4. The method according to claim 1 further comprising, for each resource allocation controller:
   a step of acquiring a signal representing the data rate of the resource allocation controller in question,
   if the data rate of said resource allocation controller is less than a predetermined nominal value while the value of bandwidth allocated to this controller is greater than said predetermined nominal value, a step of reducing the allocated value of bandwidth by allocating to said resource allocation controller a value of bandwidth substantially equal to said nominal value.

5. The method according to claim 1 further comprising a step of acquiring a signal representing a quality of service associated with the data to be transmitted by each resource allocation controller, and according to which the dynamic resource allocation device increases the priority of the value of bandwidth of the resource controllers having the highest priority, using said quality of service.

6. The method according to claim 1, wherein at least one telecommunications satellite is of the multi-channel type and wherein the method further comprises a step of modifying the gain of at least one of the channels of at least one telecommunications satellite.

7. A system of dynamic resource allocation configured for executing the method according to claim 1, comprising a dynamic resource allocation device, a group of at least one satellite access network, and at least one communications satellite comprising a frequency-flexible payload,
   said group of at least one satellite access network comprising a plurality of resource allocation controllers, each resource allocation controller being configured to transmit data to at least one modem, each resource allocation controller being connected to the dynamic resource allocation device, and each resource allocation controller being configured to deliver a signal representing the desired value of bandwidth and to transmit this signal to the dynamic resource allocation device,
   said dynamic resource allocation device comprising at least one calculation module configured to implement the method according to claim 1 and at least one module configured to allocate a value of bandwidth to the various resource allocation controllers of the group of at least one satellite access network and to reconfigure the payload of the at least one telecommunications satellite.

* * * * *